US006487566B1

(12) United States Patent
Sundaresan (10) Patent No.: US 6,487,566 B1
(45) Date of Patent: Nov. 26, 2002

(54) TRANSFORMING DOCUMENTS USING PATTERN MATCHING AND A REPLACEMENT LANGUAGE

(75) Inventor: Neelakantan Sundaresan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/166,018

(22) Filed: Oct. 5, 1998

(51) Int. Cl.$^7$ .............................................. G06F 17/21
(52) U.S. Cl. ...................................... 707/513; 707/523
(58) Field of Search ................................ 707/513, 503, 707/523, 101; 717/137, 172–173, 177–178

(56) References Cited

U.S. PATENT DOCUMENTS

| | | | | |
|---|---|---|---|---|
| 5,530,863 A | * | 6/1996 | Hino | 717/141 |
| 5,548,508 A | * | 8/1996 | Nagami | 364/419.02 |
| 5,629,846 A | * | 5/1997 | Crapo | 395/785 |
| 5,659,729 A | | 8/1997 | Nielsen | |
| 5,715,453 A | | 2/1998 | Stewart | |
| 5,768,564 A | * | 6/1998 | Andrews et al. | 707/101 |
| 5,915,259 A | * | 6/1999 | Murata | 707/513 |
| 5,940,075 A | | 8/1999 | Mutschler, III et al. | |
| 6,014,680 A | * | 1/2000 | Sato et al. | 707/513 |
| 6,052,531 A | * | 4/2000 | Waldin et al. | 707/10 |
| 6,055,522 A | * | 4/2000 | Krishna et al. | 705/517 |
| 6,073,143 A | * | 6/2000 | Nishikawa et al. | 707/513 |
| 6,083,276 A | * | 7/2000 | Davidson et al. | 709/200 |
| 6,182,092 B1 | | 1/2001 | Francis et al. | |
| 6,192,415 B1 | | 2/2001 | Haverstock et al. | |
| 6,202,072 B1 | * | 3/2001 | Kuwahara | 707/513 |
| 6,226,642 B1 | | 5/2001 | Beranek et al. | |
| 6,263,332 B1 | * | 7/2001 | Naser et al. | 707/104.1 |
| 6,272,673 B1 | * | 8/2001 | Dale et al. | 717/1 |
| 6,336,124 B1 | * | 1/2002 | Alam et al. | 707/523 |

OTHER PUBLICATIONS

Willner, Eki. "Preparing Web data with XML" Information Today. vol. 15, Issue 7, pp. 1–6.*

Bray, Tim and Sperberg–McQueen, C.M. "Extensible Markup Language (XML): Part I. Syntax" http://www.w3.org/TR/WD–xml–lang–970331. Mar. 31, 1997. pp. 1–40.*

"SGML tool: One document, several formats" Computer World. Microstar Software Ltd. Sep. 9, 1996. vol. 30, Issue 37, p. 58.*

Senna, Jeff. "XML bridges the gap" InfoWorld. Jun. 1, 1998. vol. 20, Issue 22, pp. 88–90.*

Harold, Elliotte Rusty, XML: Extensible Markup Language, published Sep. 1998, Chapters 1 and 5, http://library.books24x7.com/toc.asp?bkid=1801.*

Bray, Tim, "Document Content Description for XML" Http://www.w3.org/TR/Note–dcd, Jul. 31, 1998, pp. 1–21.

* cited by examiner

Primary Examiner—Joseph H. Feild
(74) Attorney, Agent, or Firm—Gates & Cooper LLP (57) ABSTRACT

A system for specifying transformation rules of Extensible Markup Language (XML) documents into other XML documents, wherein the rule language used is XML itself. The transformation rule specifications identify one or more transformations of the document to be performed when a pattern match occurs between the document and a source pattern. The specifications are used to define class specifications for objects that perform the transformations.

78 Claims, 3 Drawing Sheets

TRANSFORMING DOCUMENTS USING PATTERN MATCHING AND A REPLACEMENT LANGUAGE

CROSS-REFERENCE TO RELATED APPLICATIONS

This application is related to the following co-pending and commonly-assigned patent applications:

application Ser. No. 09/166,043, entitled "CONVERTING SCHEMAS TO COMPONENT MODELS," filed on Oct. 5, 1998, by Neelakantan Sundaresan, pending; and application Ser. No. 09/166,042, entitled "A FACILITY FOR ADDING DYNAMISM TO AN EXTENSIBLE MARKUP LANGUAGE," filed on Oct. 5, 1998, by Susan B. Lee and Neelakantan Sundaresan, pending;

both of which applications are incorporated by reference herein.

BACKGROUND OF THE INVENTION

1. Field of the Invention

This invention relates in general to transforming documents, and in particular, to a system for specifying and executing transformation rules for transforming extensible Markup Language (XML) documents into other XML documents, wherein the rule language used is XML itself.

2. Description of Related Art

Extensible Markup Language (XML) is poised to be the next big revolution for the World Wide Web (WWW). With the realization that the Web is not about just browsing any more, XML has emerged as an enabling technology to carry the Web to the next generation of electronic commerce, Web-based workflow, and integration of databases with Web applications.

XML describes a class of data objects called XML documents and partially describes the behavior of computer programs that process them. XML is a restricted form of SGML, the Standard Generalized Markup Language, defined in ISO 8879. The specification for XML can be found at the URL: http://www.w3.org/TR/REC-xml.

XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure.

An XML schema specifies constraints on the structures and types of elements in an XML document. The basic schema for XML is the DTD (Document Type Definition). Other XML schema definitions are also being developed, such as DCD (Document Content Definition), XSchema, etc. Information concerning DTD and DCD can be found at the URL: http://www.w3.org/.

The main difference between DTD and DCD is that DTD uses a different syntax from XML, while DCD specifies an XML schema language in XML itself. (XSchema is similar to DCD in this respect). In spite of the differences in the syntax, the goals and constraint semantics for all these XML schema languages are the same. Their commonality is that they all describe XML Schema. This means that they assume the common XML structure, and provide a description language to say how these elements are laid out and are related to each other.

There are about five basic constraints that the XML schema languages describe:

1. The attributes that an element should/may contain:
   a. the types of the attribute values (mainly string types), and
   b. the mandatory or optional nature of occurrences of these attributes.
2. The type and the order in which elements can be contained inside another element (the content model of the element):
   a. the sub-element should of a certain name or type or that a sub-element could be of any type, and
   b. a regular expression system to express how these elements occur, wherein this regular expression system can be expressed by the following operators:
      i. |: A | B (either element of type A or of type B can occur),
      ii. ,: A, B (element of type B follows one of type A),
      iii. *: A* (zero or more occurrence of element of type A),
      iv. +: A+ (one or more occurrence of element of type A),
      v. ?: A? (zero or one occurrence of element of type A), and
      vi. ( ): ( . . . ) (grouping of expressions in this system).

An EBNF (Extended Backus-Naur Form) for this regular expression system can be expressed as below:

```
re=>A
 | re | re
 | re, re
 | re*
 | re+
 | re?
 | (re)
 | ANY
```

Note that this system includes some convenience operators. For example, A+ is the same as A, A*.

A software module called an XML processor is used to read XML documents and provide access to their content and structure. It is assumed that an XML processor is doing its work on behalf of another module, called the application. The XML specification located at the URL noted above describes the required behavior of an XML processor in terms of how it must read XML data and the information it must provide to the application.

In a typical application that uses XML for a particular specification, there would be a DTD that specifies the XML schema and one or more XML documents that satisfy that schema. The application would typically convert the XML document into an object. The application programmer would typically write several lines of code to read in the XML document based upon the schema, to get and set elements and properties based upon the schema, and to notify other parts of the application when an element in the document changes.

Because XML is a generalized extensible markup language, it has incredible potential to be the ultimate format for data description, transport, and exchange. As structured and semi-structured data flows through the various nodes of the Internet and exchanged, the data may be filled in, transformed, pruned, or composed at every stage before they get delivered, browsed, or stored. Partially filled documents may get incrementally completed as they go through various sites of a workflow or a routing system.

The same document may have different views based on its locale (e.g., one view of the date (dd/mm/yy) in Europe and another in the US (mm/dd/yy)). In electronic commerce, prices of commodities have to be displayed in different currencies, have to be computed differently for different consumers (e.g., educational consumers vs. commercial consumers of a software product), etc.

If a common language like XML is used for all these processes, sufficient dynamism is required where partial or whole XML documents can be automatically transformed with the transformed document replacing the original portion of the document in-place.

In notification systems (e.g., push technologies), a user specifies an interest profile and registers herself with the content service provider. Whenever there is content that matches the user's interest the content provider pushes the content (possibly filtered based on the user interest specifics) to the user.

As content summaries and user profiles are specified in XML, a pattern matching/transform system will be of great use. Of course, pattern matching/transformation systems are known in the art.

For example, in U.S. Pat. No. 4,447,875, Bolton, Hagenmeier, Logsdon, and Miner describe a reduction processor for the evaluation of one or more functions which are stored in memory in a tree like graph where nodes implement a variable-free applicative language. This is a reduction processor and not a template-based pattern match or pattern match replacement system that takes advantage of the schema structure.

In U.S. Pat. No. 5,321,606, Kuruma and Yamano describe another transformation system based upon context-free grammar. In transformation from a symbol string to a term, transformation rules received describe structures of input symbol strings in the form of a context-free grammar, and include structures of output terms as arguments of terminal symbols and non-terminal symbols. An inputted symbol string is analyzed by reduction processing based on the structures of input symbol strings described in the transformation rules, and an intermediate tree is formed. A term for output is produced in accordance with the structures of output terms shown in the arguments of the terminal symbols and the non-terminal symbols corresponding to the structure of the inputted symbol string. Transformation of structured data is performed in like manner using transformation rules which describe structures of input data in terms of relations between classes of partial structures, and includes structures of output data as arguments of class identifiers.

In another example, in U.S. Pat. No. 5,530,863, Hino describes a programming language processing system for a computer language processing system, wherein a program described in a high level programming language is translated into another program written in lower level programming language. In one embodiment of the invention, a specification of a programming language incorporates a concept of handling various basic words classified by parts-of-speech including nouns, adjectives, conjunctions, and various logic words. The program described by the programming language is converted into an internal expression form based on a sentence structure which can be converted to a binary tree. In accordance with a logic synthesis rule for term-rewriting based on a pattern collation, a logic expressed by the internal expression form is subject to conversion to a lower level program description wherein the parts-of-speech are deleted.

In yet another example, in U.S. Pat. No. 4,599,691, Sakaki and Hashimoto describe a tree transformation in machine translation system. XSL (XML Style-sheet Language) is an XML based language specification for rendering XML documents. It has a core tree transformation language. This language is based upon search for an elements that qualify rather than based upon template based patterns as in our system. However, it does not take advantage of the schema structure in the syntax. Even though XSL has syntax to embed scripts for actions on pattern match, it does not integrate a programming language like Java for evaluation conditions of pattern match, conditions of variable evaluation in patterns, and conditions for replacement. There are other XML-based (or otherwise) query languages for XML being proposed that query XML structures and return parts of XML structures that qualify. These are not template based, however, and are not very powerful.

In still another example, in a publication by R. Ramesh and I. V. Ramakrishnan, entitled "Non-linear Pattern Matching in Trees", Journal of the Association for Computing Machinery, Vol 39, No. 2, April 1992, 295–316, the authors describe a tree pattern match algorithm for tree structures where variables occur only at the leaf level.

Thus, there is a need in the art for techniques to provide sufficient dynamism where partial or whole XML documents can be automatically transformed. Moreover, there is a need in the art for techniques that couple such dynamism with pattern matching.

SUMMARY OF THE INVENTION

To overcome the limitations in the prior art described above, and to overcome other limitations that will become apparent upon reading and understanding the present specification, the present invention discloses a system for specifying transformation rules of XML documents into other XML documents, wherein the rule language used is XML itself. The transformation rule specifications identify one or more transformations of the document to be performed when a pattern match occurs between the document and a source pattern. The specifications are used to define class specifications for objects that perform the transformations.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The preferred embodiment of the present invention describes a system for specifying transformation rules of XML documents into other XML documents in a "rule" language, wherein the rule language used is XML itself. The advantage of using XML itself is that the transformation rules can be embedded in an XML document itself or may be external to the document. By using a separate name space within the XML document for specifying the rules, the rules do not interfere with the data of the original XML document.

The present invention provides the potential for using XML not only for the Internet but also for monolithic applications that are multi-tiered or multi-staged. For example, if XML forms are used to describe intermediate forms in compilation, all the optimization rules, code generation rules can be specified in XML itself.

Not all transformations can be expressed as static rules. Some transformations are hard to express within the domain of the rule language, while other transformation rules may depend on "transformation time" parameters. Any rule-based language should be able to provide sufficient capabilities to achieve this.

Java technology has been popular for its dynamic loading and execution behavior. Thus, the preferred embodiment of the present invention combines a static rule language with Java, thereby achieving sufficient dynamism to do powerful transformations.

Hardware Environment

Figure 1:
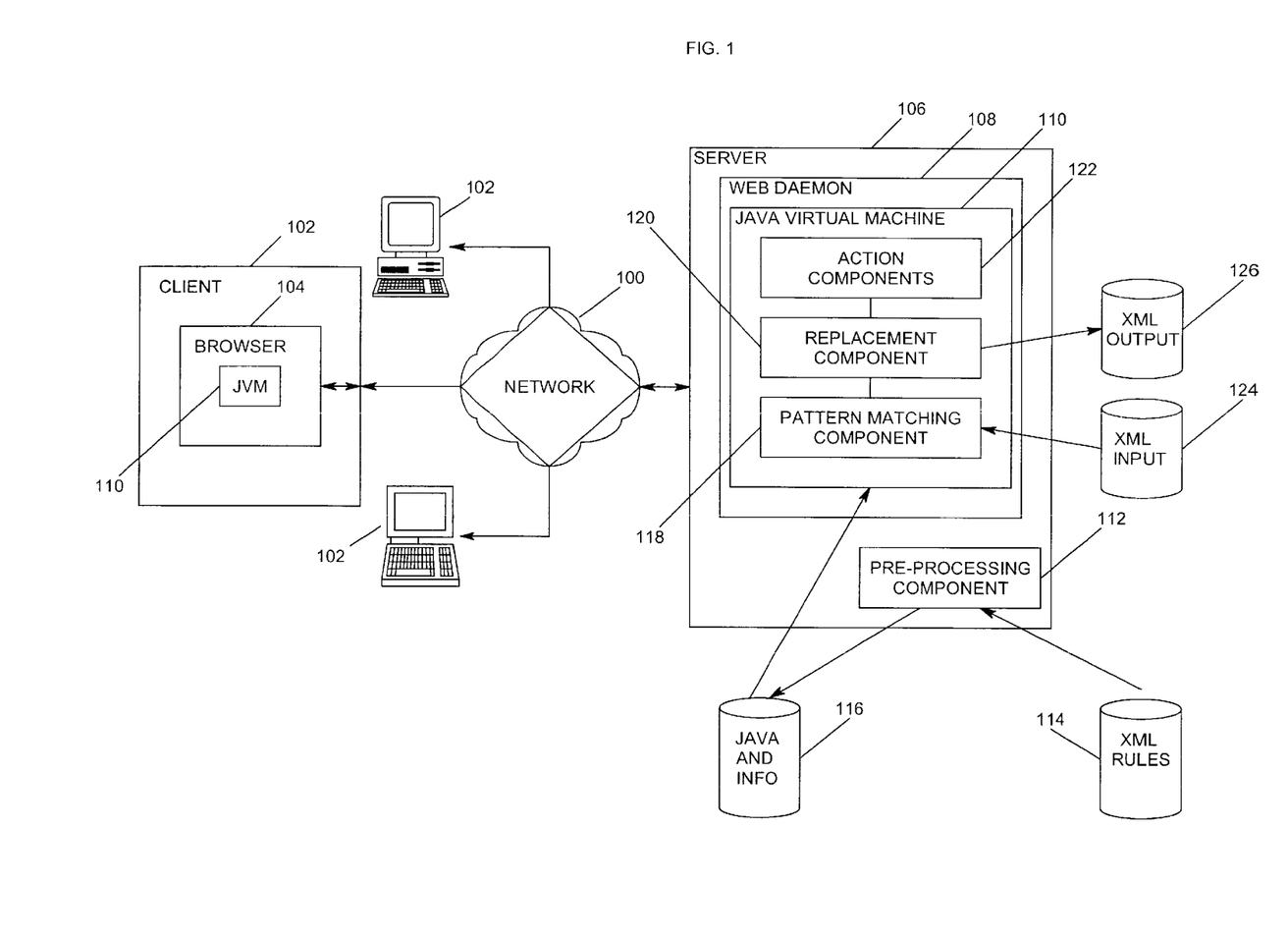
FIG. 1 is a block diagram that illustrates an exemplary client-server hardware environment of the preferred embodiment of the present invention.

FIG. 1 schematically illustrates an exemplary hardware environment that could be used in the preferred embodiment of the present invention, and more particularly, illustrates a typical distributed computer system using the Internet 100 to connect client systems 102 executing Web browsers 104 to server systems 106 executing Web daemons 108. A typical combination of resources may include clients 102 that are personal computers or workstations, and servers 106 that are personal computers, workstations, minicomputers, or mainframes. These systems are coupled to one another over a network 100, which may include other networks such as LANs, WANs, SNA networks, as well as the Internet. Either or both of the Web browser 104 and Web daemon 108 may include a Java Virtual Machine (JVM) 110 that executes Java objects, applets, scripts, etc.

The preferred embodiment of the present invention is comprised of a number of different components. A pre-processing component 112 uses XML-based rule specifications 114 to create pattern match pre-process information 116 and Java class specifications 116. The Java class specifications 116 are then instantiated as one or more pattern matching components 118 that accept and process XML input 124, replacement components 120 that generate XML output 126, and action components 122 that perform specified functions upon a pattern match.

Figure 2:
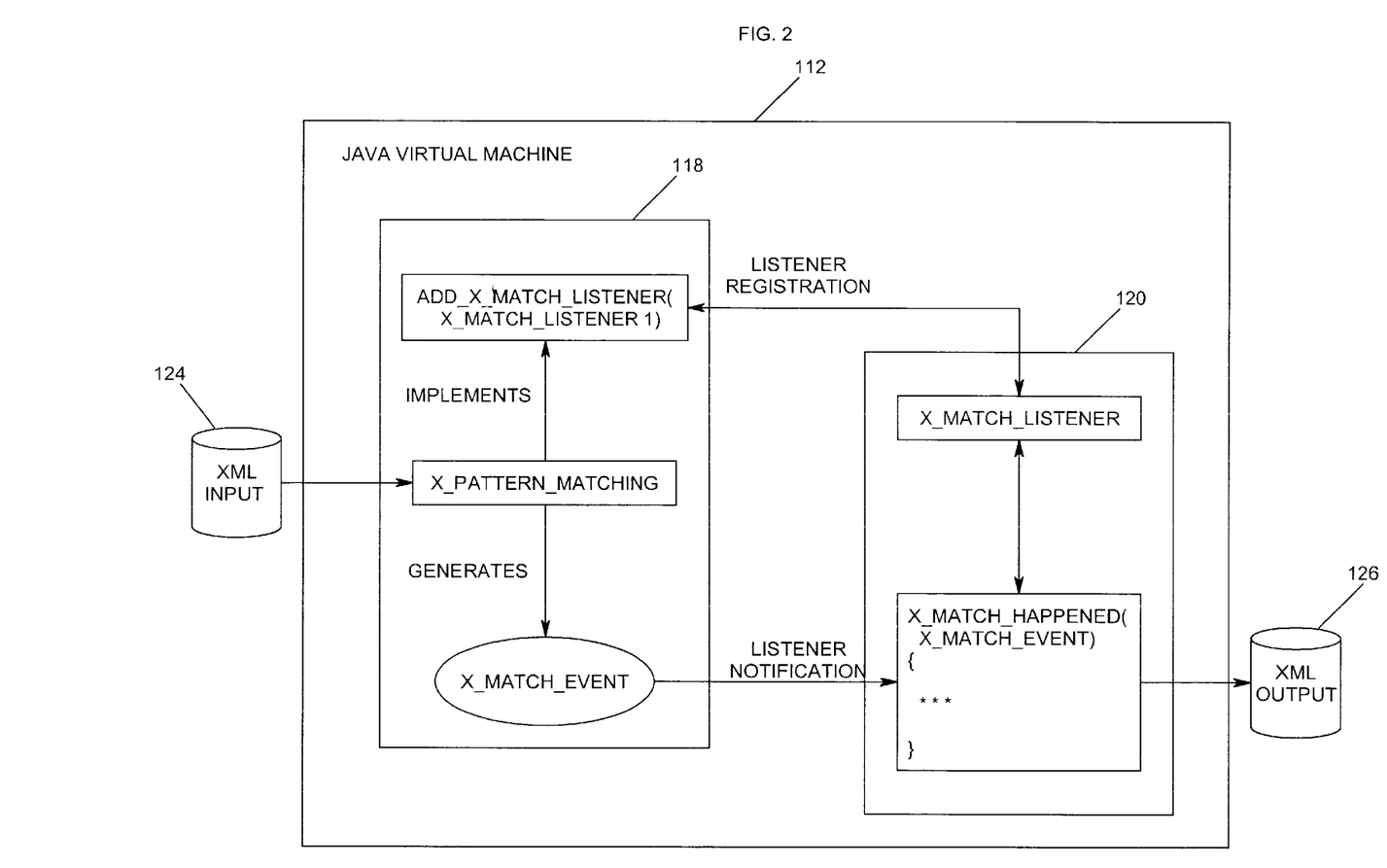
FIG. 2 is a block diagram that further illustrates the operation of the components of FIG. 1.

FIG. 2 further illustrates the operation of these components. In the preferred embodiment of the present invention, an event of a specified type is generated by the pattern matching component 118 whenever a pattern match occurs on the XML input 124. The replacement component 120 of this specified type registers as a "listener" to be notified when this match occurs. When so notified, the replacement component 120 performs a desired transformation and invokes the execution of one or more action components 122, if necessary. By separating out the pattern matching component 118 from the replacement component 120 and the action components 122, the preferred embodiment of the present invention may be used for cases where pattern matches are performed for purposes other than transformation. Moreover, by using separate components, the preferred embodiment of the present invention is reusable and extensible.

In general, the pre-processing components 112, XML rules specifications 114, Java class specifications 116, pattern matching components 118, replacement components 120, action components 122, XML input 124, and XML output 126 comprise data and/or instructions which, when read, interpreted, and/or executed by the server computer 106, cause the computer 106 to perform the steps for performing and/or using the present invention. Generally, the data and/or instructions are embodied in and/or readable from a device, carrier or media, such as memory, data storage devices, and/or remote devices coupled to the computer via a data communications device.

However, those skilled in the art will recognize that the exemplary environment and components illustrated in FIGS. 1 and 2 are not intended to limit the present invention. Indeed, those skilled in the art will recognize that other alternative hardware environments may be used without departing from the scope of the present invention.

Thus, the present invention may be implemented as a method, apparatus, or article of manufacture using standard programming and/or engineering techniques to produce software, hardware, firmware, or any combination thereof. In addition, the term "article of manufacture" as used herein is intended to encompass logic and/or data embodied in or accessible from any device, carrier, or media.

Operation of the Invention

Using the components described above, the preferred embodiment of the present invention provides a pattern matching language, known as PML, that performs pattern matching and replacement functions for transforming any XML instance to any other XML instance. The PML pattern language is comprised of a sequence of rules expressed in XML, wherein each rule has four main components: (1) a source pattern (pat), (2) a condition (cond), (3) a target pattern (tgt), and (4) an action part (action).

The source pattern is matched against a subject XML structure, and if there is a match, the condition is evaluated. If the condition evaluates to true, the substructure of the XML structure is replaced by the target; otherwise, the XML substructure is left unchanged. Further, a pattern match may be associated with multiple conditions and multiple target patterns. If a condition is not present, then only replacement occurs when the pattern matches.

A typical rule in PML can be described as:

Pat -> cond1 tgt1
   cond2 tgt2
   condN tgtN
   action The language provides its own namespace within the XML document called "pml." Each rule has a tag, identified as pml:rule, the DTD of which can be described as:

<!ELEMENT pml:rule (pml:source pml:target+ pml:action?)>
<!ELEMENT pml:source ANY>
<!ELEMENT pml:target ANY>
<!ATTLIST pml:target COND #IMPLIED>
<!ELEMENT pml:action PCDATA>

Each of the parts of the PML pattern language, i.e., source, target, action, is described in more detail below.

The Source Pattern Language

The source pattern can be any well-formed XML element structure. Since PML is template-based, the source pattern represents an intended matching template pattern of an XML tree. Thus, structurally the source pattern looks like an XML tree, except for some annotations that are parameters in the pattern, which are filled in by actual subtrees when a matching XML tree is found. To enable the representation of these parameters, PML provides a set of tags in the pml namespace, as described in more detail below.

The pml:ANY Element

The simplest of the tags is the "pml:ANY" element. The DTD specification for pml:ANY is as follows:

<!ELEMENT pml:ANY EMPTY>

This element in the pattern tree corresponds to (matches) any subtree in an XML tree. Thus, pml:ANY is a variable.

The pml:ANY may be constrained in four ways.

1. By identifying the pml:ANY element. An attribute pml:ID is used to identify the subtree. The identified nodes are then used by references (pml:IDREF) in the target patterns and the action description.
2. ANY elements can be named using the "name" attribute. When two pattern ANY elements have the same NAME, then they correspond to the structurally similar matched patterns. This is possible only if the pattern matching method handles non-linear patterns. Non-linear patterns are patterns with the additional constraint that if there two positions in the pattern tree with the same variable name, the target subtree matching these variables should be equal.
3. Another way to constrain an ANY node is by specifying a COND attribute with the pml:ANY node. The COND attribute is the name of a Java Class that corresponds to a unary predicate. In such a case, the pml:ANY node matches a particular node in the subject tree only with the associated predicate evaluates to true. This predicate is passed a reference to the subject subtree under comparison.
4. Another way of constraining an ANY node is by specifying children pattern. This matches any sub-tree whose children match the children pattern of the ANY node.

A DTD that conforms to the above requirements is as follows:

<!ELEMENT pml:ANY ANY>
<!ATTLIST pml:ANY
  pml:VAR NMTOKEN #IMPLIED
  pml:ID NMTOKEN #IMPLIED
  pml:IDREF CDATA #IMPLIED
  pml:COND CDATA #IMPLIED>

The Source Expression Language

One feature of PML is that it recognizes that it is possible to use DTD restrictions in describing expression structures in the source patterns. Since XML structures obey DTDs, and since DTDs embed regular expression languages, the source pattern expression language is a regular expression tree language that includes the following operators:

1) *: A* (zero or more occurrence of element of type A),
2) +: A+ (one or more occurrence of element of type A),
3) |: A | B (either element of type A or of type B can occur),
4) ?: A? (zero or one occurrence of element of type A),
5) ,: A, B (element of type B follows one of type A), and
6) ( ): ( . . . ) (grouping of expressions in this system).

Of these five operators, operators (5) and (6) do not need to be expressed, since they are already subsumed in PML. Specifically, operator (5) is subsumed in PML because the sequence order of a set of siblings is same as the order in which they are written down. Further, operator (6) is subsumed in PML because any operator is applicable to the subtree under it, thus automatically grouping subtrees on which regular expression operators may be applied.

Hence, the preferred embodiment of the present invention provides four PML element names, pml:PLUS, pml:STAR, pml:OR, and pml:QUEST, to indicate operators (1), (2), (3), and (4), respectively. These operators are used in the manner indicated in the following examples.

An example of operator (1) is:
    <pml:STAR>
        <FOO> . . . </FOO>
        <BAR> . . . </BAR>
    </pml:STAR>

The above example indicates zero or more occurrences of pairs of FOO subtrees and BAR subtrees.

An example of operator (2) is:
    <pml:QUEST>
        <FOO> . . . </FOO>
    </pml:QUEST>

The above example indicates zero or one occurrence of FOO.

An example of operator (3) is:
    <pml:OR>
        <A> . . . </A>
        <B> . . . </B>
    </pml:OR>

The above example indicates an occurrence of A or an occurrence of B pattern subtree.

The PML expression elements can also have attributes. These attributes can be one of the following:

pml:ID (to identify a pattern expression which can be referred to in a target or action), and pml:COND (a Java unary predicate class name, which is evaluated and the pattern match is true only if this condition is true).

The DTD for the source pattern expression language is provided below:

<!ELEMENT pml:QUEST ANY>
<!ELEMENT pml:QUEST
    pml:ID NMTOKEN #IMPLIED
    pml:COND CDATA #IMPLIED>

Although the example is only pml:QUEST, the other operators are the same except for the element name.

The pml:ANYPATH Element

The pml:ANYPATH element is used to indicate an arbitrary descendent of an element. An example is provided below:

<Foo>
    <pml:ANYPATH>
        <Bar> . . . </Bar>
    </pml:ANYPATH>
</Foo>

The above example indicates a Foo element with Bar as an arbitrary descendent. The COND, and ID attributes can be attached to the Bar element. The pattern match returns true only if the predicate evaluation attached to the COND returns true.

The pml:ALL Abbreviation

When the body of a pml:STAR expression is an ANY, the abbreviation pml:ALL can be used. An example is provided below:

<pml:STAR>
    <pml:ANY/>
</pml:STAR>

The above example is equivalent to the following:

<pml:ALL/>

Since pml:COND can be applied at the element level (pml:ANY) and at the group level (pml:STAR), to avoid confusion, pml:ALL abbreviation can only be performed when the pml:STAR does not have a COND attribute. The COND attribute attached to the ANY node is the same as the COND attribute attached to the ALL node.

Matching Text

The pml:Text attribute is used to match PCDATA (text leaf children) in the source pattern. The DTD description for this pattern would be the following:

<!ELEMENT pml:Text EMPTY/>
<!ATTLIST pml:Text
  pml:ID NMTOKEN #IMPLIED
  pml:COND CDATA #IMPLIED
  pml:value CDATA #IMPLIED>

When an ID is specified, the matched pattern can be used in the target pattern with a corresponding IDREF. When a pml:COND is specified, a match occurs only when the COND predicate evaluates to true. When a pml:value attribute is specified, a match occurs only when the data contained in the PCDATA structure in the subject tree matches this value. Only one of the pml:COND or pml:VALUE may be specified.

Matching Attributes

XML elements can have attributes and PML provides facilities to match attribute patterns. As far as the pattern matching method is concerned, an attribute of an element is a child of an element of name (same as the attribute name) and an atomic value (the attribute value). PML provides some convenient pattern syntax to match attributes.

An example of the DTD is provided below:

<!ELEMENT pml:attribute
  name NMTOKEN #IMPLIED
  value CDATA #IMPLIED
  COND CDATA #IMPLIED
  pml:ID CDATA #IMPLIED>

In another example:

<pml:attribute name="image" COND="attrCond"/>

The above example matches an attribute named "image" if the Java predicate corresponding to attrCond returns true.

Those skilled in the art will recognize that additional convenient syntax could be added to match regular expressions.

The Target Pattern Language

When no target pattern is specified corresponding to a source pattern, the PML processor generates a match event when the source pattern is matched, and notifies all the listeners that are attached to the match event.

When one or more target patterns are specified, each results in a match listener being generated. A COND attribute may be attached to the target pattern. If such an attribute is present, the value of the COND attribute represents a Java class denoting a unary predicate. This predicate is evaluated with the matched subtree as an argument. If the predicate evaluates to true, the transformation is performed; otherwise, the next target pattern is considered. The evaluation of the target pattern is similar to a programming language CASE or SWITCH statement. The target patterns are tried, one at a time, in the order of their occurrence, until the one whose COND attribute evaluates to true is found or until one without a COND attribute is found.

<!ATTLIST pml:target
  pml:COND CDATA #IMPLIED>

The above structure is used to specify selection of the right transformation among multiple targets.

One of the common nodes in the target pattern is the ANY pattern with an IDREF attribute. The IDREF attributes refers to an ID attribute in the source pattern. In the process of tree transformation, the subtree that matches the pattern rooted at a node with a particular ID attribute is inserted in the target position at the position of a node which refers to the source pattern through an IDREF attribute.

Consider the following rule:

```
<source>
  <Table>
    <Description>
      <Bag pml:ID = "x">
        <pml:STAR>
          <LI> <pml:ANY/> </LI>
        </pml:STAR>
      </Bag>
    </Description>
  </Table>
</source>
<target>
  <Table>
    <pml:ANY pml:IDREF = "x"/>
  </Table>
</target>
```

In the above example, the target includes the Bag subtree from the source.

Matched Attributes

When an attribute in the source pattern is matched, the target pattern can refer to an pml:IDREF (assuming that there is an pml:ID in the source pattern). Since XML attributes are (name, value) pairs, the name and value may be accessed separately.

The attribute can be referred to as a whole by the following:

<pml:attribute pml:IDREF=" . . . "/>or
<pml:ANY pml:IDREF=" . . . "/>

The replacement component 120 inserts the matched attribute structure at the current position. The name only of the attribute can be referred to by the following:

<pml:attrib-name pml:IDREF=" . . . "/>

The value only of the attribute can be referred to by the following:

<pml:attrib-value pml:IDREF=" . . . "/>

The replacement component 120, when it recognizes the pml:attrib-name or pml:attrib-value, replaces the name and/or value of the matched subject attribute, respectively, in the current position.

The Actions Part

Every PML rule may have an optional "action" part. The action part specifies what action component 122 is to be invoked/executed when a pattern is matched. The action part may be preceded by one or more target parts, as described above. In this case, the action component 122 performs its assigned functions on the possibly transformed tree.

The DTD for the action part is provided below:

<!ELEMENT ACTION PCDATA>

The PCDATA comprises the actual programming code that becomes the action component 122. The action component 122 is invoked either when no transformation is required (in which case, there is no target part) but some function needs to executed when a pattern match succeeds, or when some function needs to be executed after a tree has been matched and possibly transformed using the target part. In the latter case, the action component 122 may be invoked because the structural tree transformation specified in the target part was inadequate.

The programming code in the action part should be able to refer to portions of the source/transformed tree. The mechanism used for this is the ID attribute.

For a subtree with ID x, the programming code can refer to this node as $(x). The programming code can refer to the root of the source/target as $$. Since names starting with $ are not legal in Java, the system can be sure that these names will not conflict with any of the real variable names in the programming code.

The action component 122 replaces these $ variables with actual references to appropriate subtrees from the tree in question. A simple replacement scheme replaces $(x) with a function call that looks for an element tree in the tree which has an ID attribute whose value is x.

Note that it is possible that the programming code in the action part can contain legal Java syntax but cannot legally occur as a PCDATA (for example, the < (less than) sign). It is up to the user to insert a CDATA to make sure that the entire Java programming code is included.

Consider the following rule:

```
<rule>
  <source>
    <LI> <pml:ANY ID="x"> </LI>
  </source>
  <target>
    <UL> <pml:ANY IDREF="x" ID="y"> </UL>
  </target>
  <action>
    TXElement root=$$;
    Root.addChild($(y)); // insert a child at the root level
      from a
      // subtree in the target pattern whose ID
      // was "y".
  </action>
</rule>
```

Pattern Matching Logic

Figure 3:
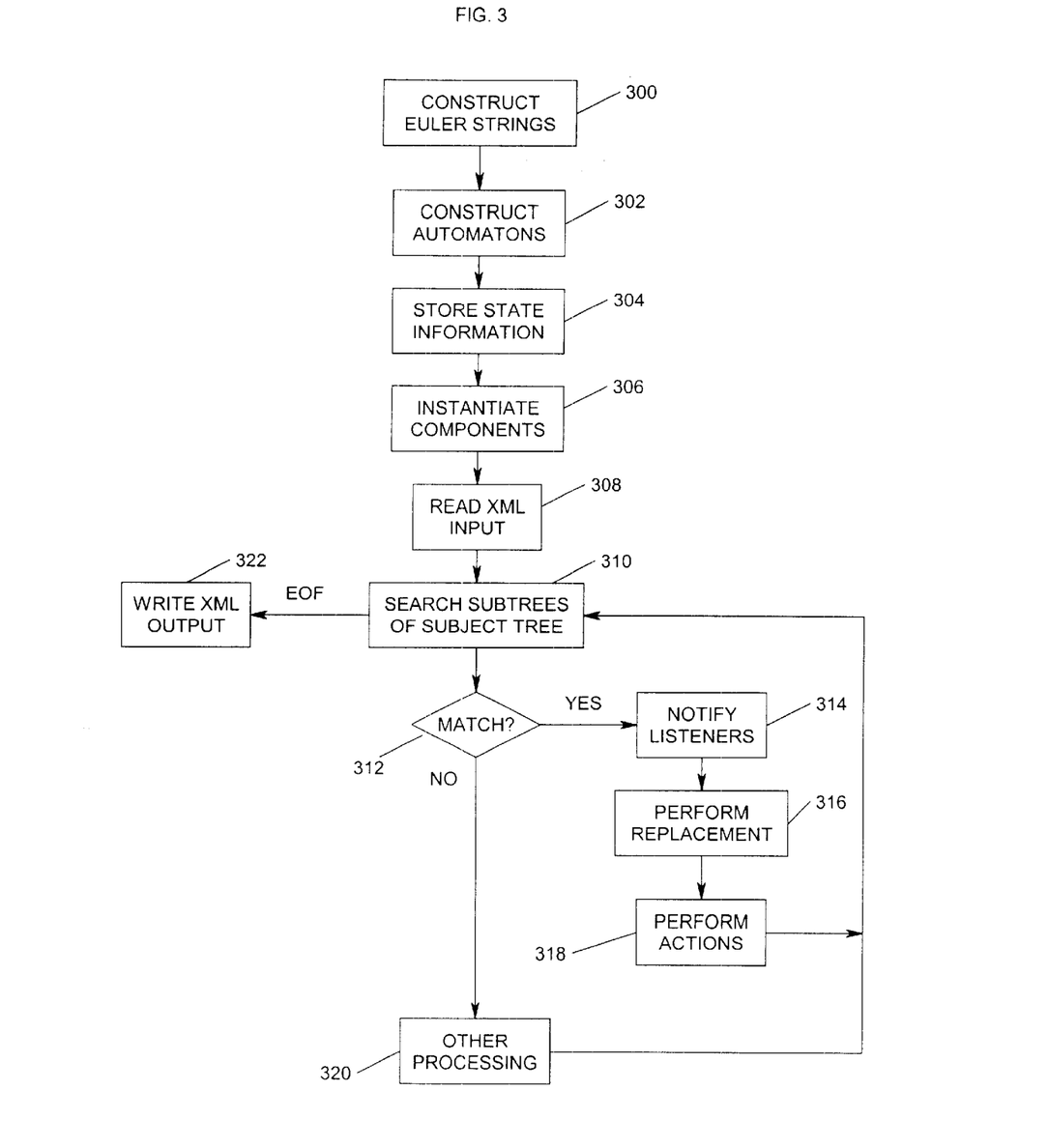
FIG. 3 is a flowchart that illustrates the logic performed by the components according to the preferred embodiment of the present invention.

FIG. 3 is a flowchart that illustrates the steps performed by the preferred embodiment of the present invention. The pattern matching method is comprised of two phases: (1) a pre-processing phase performed by the pre-processing component 112 and (2) an actual tree matching performed by the pattern matching component 118.

The pre-processing phase that has three subphases (Blocks 300–304).

Block 300 represents a first subphase, wherein an Euler string of the source pattern and an Euler string of the subject tree are built from the rules specification 114 and the Euler strings are saved as Java classes 116. This information is reused for every new subject tree in the XML input 124. The Euler strings of the subject trees are built when the XML input 124 is processed. Also, at least parts of the Euler strings of the subject tree are re-computed when the XML input 124 undergoes transformation after a pattern match.

Block 302 represents a second sub-phase, wherein one or more Aho-Corasick automatons (described in the publication Aho-Corasick, Communications of the ACM, 1975, which publication is incorporated by reference herein) are constructed (in the form of Java classes 116) for both the Euler strings of the source pattern and the Euler strings of the subject tree. Again, the automatons for the Euler strings of the source pattern are built when the rules specification 114 is read, while the Euler strings for the subject tree are built when the XML input 124 is processed, and the Euler strings for the subject tree are re-computed after every transformation of the subject tree.

Block 304 represents a third subphase, wherein the Euler strings of the subject tree are scanned by the automatons to store state information associated therewith in Euler string records. In doing so, the positions where to start matching in the subject tree are identified.

Blocks 306–320 further describe the pattern matching phase.

Block 306 represents the pattern matching component 118, replacement component 120, and actions components 122 being instantiated in the Java Virtual Machine 112.

Block 306 represents the pattern matching component 118 reading the XML input 124.

Blocks 310–320 represent a loop through all subtrees in the XML input 124.

Block 310 represents the pattern matching component 118 searching for the next subtree of the subject tree in the XML input 124.

Block 312 is a decision block that represents the pattern matching component 118 determining whether the subtree matches a source pattern.

Block 314 represents the pattern matching component 118 notifying any listeners in the replacement component 120 that are registered for the source pattern.

Block 316 represents the replacement component 120 replacing the source pattern with the target pattern in the subject tree. The preferred embodiment identifies two trees as equivalent if their Euler strings are equal. Since the Euler strings were already computed in Block 300, all that needs to be performed is a string comparison to check for consistency.

Block 318 represents the optional execution of one or more action components 122, as directed by the replacement component 120.

Block 320 represents other processing. Thereafter, control transfers to Block 310.

Finally, Block 322 represents the XML output 126 being generated, after all processing is completed.

CONCLUSION

This concludes the description of the preferred embodiment of the invention. The following describes some alternative embodiments for accomplishing the present invention. For example, any type of computer, such as a mainframe, minicomputer, or personal computer, could be used to implement the present invention. In addition, the present invention is not limited by specific document or programming languages, and could comprise languages other than XML and Java. For example, the present invention could also be used with HTML, SGML, NetRexx, VisualBasic Script, XML, Perl, C, C++, Cobol, etc.

In summary, the present invention discloses a method, apparatus, and article of manufacture for specifying transformation rules of XML documents into other XML documents, wherein the rule language used is XML itself. The transformation rule specifications identify one or more transformations of the document to be performed when a pattern match occurs between the document and a source pattern. The specifications are used to define class specifications for objects that perform the transformations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for transforming a document, comprising the steps of:

(a) creating one or more programs from one or more rule specifications, wherein:

(i) the rules specifications identify one or more transformations of the document to be performed when a pattern match occurs between the document and a source pattern;

(ii) the rules specifications are defined using a first programming language; and (iii) the document is defined in the first programming language both before and after transformation; and (b) executing the programs in the computer to perform the transformations of the document when the pattern match occurs between the document and the source pattern.

2. The method of claim 1, wherein the rules specifications identify one or more actions to be performed when a pattern match occurs between the document and a source pattern.

3. The method of claim 2, further comprising the step of performing the actions when the pattern match occurs between the document and the source pattern.

4. The method of claim 1, wherein the document is an eXtensible Markup Language (XML) document.

5. The method of claim 4 above, wherein the rules specifications are defined in XML.

6. The method of claim 5 above, wherein the rules specifications are embedded in the XML document.

7. The method of claim 5 above, wherein the rules specifications are external to the XML document.

8. The method of claim 1, wherein the creating step further comprises the step of creating one or more class specifications from the rule specifications and the executing step further comprises the step of instantiating the class specifications as one or more of the computer programs.

9. The method of claim 8, wherein the class specifications comprise Java class specifications and the instantiated class specifications comprise Java objects.

10. The method of claim 1, wherein the computer programs are selected from a group comprising one or more pattern matching components, one or more replacement components, and one or more action components.

11. The method of claim 1 above, further comprising the steps of:

(1) registering one or more of the computer programs as a listener to be notified when a pattern match occurs between the source pattern and the document; and (2) notifying the registered listener to perform one or more of the transformations whenever the pattern match occurs between the source pattern and the document.

12. The method of claim 11 above, further comprising the step of invoking one or more functions from the notified listener.

13. The method of claim 1 above, further comprising the steps of:

(1) registering one or more of the computer programs as a listener to be notified when a pattern match occurs between the source pattern and the document; and (2) notifying the registered listener to perform one or more actions whenever the pattern match occurs between the source pattern and the document.

14. The method of claim 1 above, wherein the rules specification comprises a pattern matching language.

15. The method of claim 14 above, wherein the pattern matching language includes one or more components selected from a group comprising: (1) a source pattern, (2) a condition, (3) a target pattern, and (4) an action part.

16. The method of claim 14 above, wherein the pattern matching language is based upon a schema structure for the document.

17. The method of claim 14 above, wherein the schema comprises a regular expression language.

18. The method of claim 17 above, wherein the regular expression language comprises one or more declarations of elements enclosed within an element.

19. The method of claim 17 above, wherein the regular expression language includes one or more regular expression operators selected from a group comprising:

(1) a "zero or more" operator, (2) a "one or more" operator, (3) a "one or the other" operator, (4) a "one followed by the other" operator, (5) a "zero or one" operator, (6) a "grouping" operator, and (7) an "any" operator.

20. The method of claim 14 above, further comprising the step of optimizing the regular expression language prior to generating the class specifications.

21. The method of claim 1 above, wherein the rules specification provides its own namespace within the document.

22. The method of claim 1 above, wherein the transformations comprise one or more replacements to be made in the document when the pattern match occurs between the source pattern and the document.

23. The method of claim 1 above, wherein the transformations are performed based on an evaluation of one or more conditions for the pattern match between the source pattern and the document.

24. The method of claim 23 above, wherein the conditions comprise one or more predicates.

25. The method of claim 1 above, wherein the rules specifications include one or more filters for the pattern match between the source pattern and the document.

26. The method of claim 1 above, wherein the rules specifications include one or more wildcards for the pattern match between the source pattern and the document.

27. An apparatus for transforming a document, comprising:

(a) a computer; and (b) means, performed by the computer, for creating one or more programs from one or more rule specifications, wherein:

(i) the rules specifications identify one or more transformations of the document to be performed when a pattern match occurs between the document and a source pattern;

(ii) the rule specification is defined using a first programming language; and (iii) the document is defined in the first programming language both before and after transformation; and (c) means, performed by the computer, for executing the programs in the computer to perform the transformations of the document when the pattern march occurs between the document and the source pattern.

28. The apparatus of claim 27, wherein the rules specifications identify one or more actions to be performed when a pattern match occurs between the document and a source pattern.

29. The apparatus of claim 28, further comprising means for performing the actions when the pattern match occurs between the document and the source pattern.

30. The apparatus of claim 27, wherein the document is an eXtensible Markup Language (XML) document.

31. The apparatus of claim 30 above, wherein the rules specifications are defined in XML.

32. The apparatus of claim 31 above, wherein the rules specifications are embedded in the XML document.

33. The apparatus of claim 31 above, wherein the rules specifications are external to the XML document.

34. The apparatus of claim 27, wherein the means for creating further comprises means for creating one or more class specifications from the rule specifications and the means for executing further comprises means for instantiating the class specifications as one or more of the programs.

35. The apparatus of claim 34, wherein the class specifications comprise Java class specifications and the instantiated class specifications comprise Java objects.

36. The apparatus of claim 27, wherein the programs are selected from a group comprising one or more pattern matching components, one or more replacement components, and one or more action components.

37. The apparatus of claim 27 above, further comprising:
   (1) means for registering one or more of the programs as a listener to be notified when a pattern match occurs between the source pattern and the document; and
   (2) means for notifying the registered listener to perform one or more of the transformations whenever the pattern match occurs between the source pattern and the document.

38. The apparatus of claim 37 above, further comprising means for invoking one or more functions from the notified listener.

39. The apparatus of claim 27 above, further comprising:
   (1) means for registering one or more of the programs as a listener to be notified when a pattern match occurs between the source pattern and the document; and
   (2) means for notifying the registered listener to perform one or more actions whenever the pattern match occurs between the source pattern and the document.

40. The apparatus of claim 27 above, wherein the rules specification comprises a pattern matching language.

41. The apparatus of claim 40 above, wherein the pattern matching language includes one or more components selected from a group comprising: (1) a source pattern, (2) a condition, (3) a target pattern, and (4) an action part.

42. The apparatus of claim 40 above, wherein the pattern matching language is based upon a schema structure for the document.

43. The apparatus of claim 40 above, wherein the schema comprises a regular expression language.

44. The apparatus of claim 43 above, wherein the regular expression language comprises one or more declarations of elements enclosed within an element.

45. The apparatus of claim 43 above, wherein the regular expression language includes one or more regular expression operators selected from a group comprising:
   (1) a "zero or more" operator,
   (2) a "one or more" operator,
   (3) a "one or the other" operator,
   (4) a "one followed by the other" operator,
   (5) a "zero or one" operator,
   (6) a "grouping" operator, and
   (7) an "any" operator.

46. The apparatus of claim 40 above, further comprising means for optimizing the regular expression language prior to generating the class specifications.

47. The apparatus of claim 27 above, wherein the rules specification provides its own namespace within the document.

48. The apparatus of claim 27 above, wherein the transformations comprise one or more replacements to be made in the document when the pattern match occurs between the source pattern and the document.

49. The apparatus of claim 27 above, wherein the transformations are performed based on an evaluation of one or more conditions for the pattern match between the source pattern and the document.

50. The apparatus of claim 49 above, wherein the conditions comprise one or more predicates.

51. The apparatus of claim 27 above, wherein the rules specifications include one or more filters for the pattern match between the source pattern and the document.

52. The apparatus of claim 27 above, wherein the rules specifications include one or more wildcards for the pattern match between the source pattern and the document.

53. An article of manufacture embodying logic for performing a method for transforming a document, the method comprising the steps of:
   (a) creating one or more programs from one or more rule specifications, wherein:
      (i) the rules specifications identify one or more transformations of the document to be performed when a pattern match occurs between the document and a source pattern;
      (ii) the rule specification is defined using a first programming language; and
      (iii) the document is defined in the first programming language both before and after transformation; and
   (b) executing the programs in the computer to perform the transformations of the document when the pattern match occurs between the document and the source pattern.

54. The article of manufacture of claim 28, wherein the rules specifications identify one or more actions to be performed when a pattern match occurs between the document and a source pattern.

55. The article of manufacture of claim 54, wherein the method further comprises the step of performing the actions when the pattern match occurs between the document and the source pattern.

56. The article of manufacture of claim 28, wherein the document is an eXtensible Markup Language (XML) document.

57. The article of manufacture of claim 56 above, wherein the rules specifications are defined in XML.

58. The article of manufacture of claim 57 above, wherein the rules specifications are embedded in the XML document.

59. The article of manufacture of claim 57 above, wherein the rules specifications are external to the XML document.

60. The article of manufacture of claim 28, wherein the creating step further comprises the step of creating one or more class specifications from the rule specifications and the executing step further comprises the step of instantiating the class specifications as one or more of the programs.

61. The article of manufacture of claim 60, wherein the class specifications comprise Java class specifications and the instantiated class specifications comprise Java objects.

62. The article of manufacture of claim 28, wherein the programs are selected from a group comprising one or more pattern matching components, one or more replacement components, and one or more action components.

63. The article of manufacture of claim 28 above, wherein the method further comprises the steps of:
   (1) registering one or more of the programs as a listener to be notified when a pattern match occurs between the source pattern and the document; and
   (2) notifying the registered listener to perform one or more of the transformations whenever the pattern match occurs between the source pattern and the document.

64. The article of manufacture of claim 63 above, wherein the method further comprises the step of invoking one or more functions from the notified listener.

65. The article of manufacture of claim 28 above, wherein the method further comprises the steps of:
 (1) registering one or more of the programs as a listener to be notified when a pattern match occurs between the source pattern and the document; and
 (2) notifying the registered listener to perform one or more actions whenever the pattern match occurs between the source pattern and the document.

66. The article of manufacture of claim 28 above, wherein the rules specification comprises a pattern matching language.

67. The article of manufacture of claim 66 above, wherein the pattern matching language includes one or more components selected from a group comprising: (1) a source pattern, (2) a condition, (3) a target pattern, and (4) an action part.

68. The article of manufacture of claim 66 above, wherein the pattern matching language is based upon a schema structure for the document.

69. The article of manufacture of claim 66 above, wherein the schema comprises a regular expression language.

70. The article of manufacture of claim 69 above, wherein the regular expression language comprises one or more declarations of elements enclosed within an element.

71. The article of manufacture of claim 69 above, wherein the regular expression language includes one or more regular expression operators selected from a group comprising:
 (1) a "zero or more" operator,
 (2) a "one or more" operator,
 (3) a "one or the other" operator,
 (4) a "one followed by the other" operator,
 (5) a "zero or one" operator,
 (6) a "grouping" operator, and
 (7) an "any" operator.

72. The article of manufacture of claim 66 above, wherein the method further comprises the step of optimizing the regular expression language prior to generating the class specifications.

73. The article of manufacture of claim 28 above, wherein the rules specification provides its own namespace within the document.

74. The article of manufacture of claim 28 above, wherein the transformations comprise one or more replacements to be made in the document when the pattern match occurs between the source pattern and the document.

75. The article of manufacture of claim 28 above, wherein the transformations are performed based on an evaluation of one or more conditions for the pattern match between the source pattern and the document.

76. The article of manufacture of claim 75 above, wherein the conditions comprise one or more predicates.

77. The article of manufacture of claim 28 above, wherein the rules specifications include one or more filters for the pattern match between the source pattern and the document.

78. The article of manufacture of claim 28 above, wherein the rules specifications include one or more wildcards for the pattern match between the source pattern and the document.

* * * * *